US012116809B2

(12) United States Patent
Kawano et al.

(10) Patent No.: US 12,116,809 B2
(45) Date of Patent: Oct. 15, 2024

(54) VEHICULAR DOOR HANDLE DEVICE

(71) Applicant: AISIN CORPORATION, Kariya (JP)

(72) Inventors: Masayuki Kawano, Kariya (JP); Kazuyoshi Mori, Kariya (JP); Akiyoshi Sawada, Kariya (JP)

(73) Assignee: AISIN CORPORATION, Kariya (JP)

( * ) Notice: Subject to any disclaimer, the term of this patent is extended or adjusted under 35 U.S.C. 154(b) by 152 days.

(21) Appl. No.: 17/584,834

(22) Filed: Jan. 26, 2022

(65) Prior Publication Data

US 2022/0259897 A1 Aug. 18, 2022

(30) Foreign Application Priority Data

Feb. 12, 2021 (JP) ................................ 2021-020660
Nov. 1, 2021 (JP) ................................ 2021-178614

(51) Int. Cl.
*E05B 77/34* (2014.01)
*E05B 81/76* (2014.01)

(52) U.S. Cl.
CPC .............. *E05B 77/34* (2013.01); *E05B 81/77* (2013.01)

(58) Field of Classification Search
CPC .......... E05B 77/34; E05B 81/77; E05B 81/76; E05B 85/16
See application file for complete search history.

(56) References Cited

U.S. PATENT DOCUMENTS 10,174,529 B2 * 1/2019 Saitou .................... H01H 13/06
2020/0392769 A1 * 12/2020 Nakamura ......... H03K 17/9622

FOREIGN PATENT DOCUMENTS

CN 207892398 U 9/2018
JP 2002-322834 A 11/2002
JP 200232200834 * 11/2002 ............... E05B 1/00

* cited by examiner

*Primary Examiner* — Kristina R Fulton
*Assistant Examiner* — Thomas L Neubauer
(74) *Attorney, Agent, or Firm* — Oblon, McClelland, Maier & Neustadt, L.L.P.

(57) ABSTRACT

A vehicular door handle device includes a housing being gripped from outside of a compartment when a door is opened, hollow, and provided with an opening, a switch device being fixed inside the housing and including a movable contact portion disposed so as to face the opening of the housing, an operation member fitting in the opening and being supported so as to be movable in a first direction from inside to outside of the housing and in a second direction opposite to the first direction, and a protector including a main body portion covering the switch device, and a first seal portion being inserted into a gap between an inner circumferential portion of the opening and an outer circumferential portion of the operation member and filling the gap, and pressing the movable contact portion of the switch device by being pressed by the operation member.

5 Claims, 10 Drawing Sheets

VEHICULAR DOOR HANDLE DEVICE

CROSS REFERENCE TO RELATED APPLICATIONS

This application is based on and claims priority under 35 U.S.C. § 119 to Japanese Patent Application 2021-178614, filed on Nov. 1, 2021, and Japanese Patent Application 2021-20660, filed on Feb. 12, 2021, the entire contents of which are incorporated herein by reference.

TECHNICAL FIELD

This disclosure generally relates to a vehicular door handle device including a switch device for operating an electronic control door lock device that locks and unlocks a door of a vehicle, an electronic control door latch device that holds the door of the vehicle in a closed state, and the like.

BACKGROUND DISCUSSION

JP 2002-322834A (Reference 1) describes a vehicular door handle device including a switch device (as a trigger for emitting an operation signal) for operating an electronic control device of a vehicular door. The vehicular door handle device includes a housing (grip portion) extending in a vehicle front-rear direction. The switch device is housed inside the housing. The switch device is a normally open switch of a push-button type.

An opening is provided in a surface (portion facing a door panel) of the housing facing an inside of a compartment. The switch device is fixed inside the housing in such a way that a movable contact portion of the switch device faces the opening. A switch operation portion (key top) fits in the opening. When the switch operation portion is pressed from an outside of the housing to an inside, the switch operation portion slightly enters the housing. The movable contact portion of the switch device is pressed by the switch operation portion, and comes into contact with a fixed contact portion. In this way, the switch device changes from an off state to an on state.

When a water droplet enters the housing from a gap between an outer circumferential surface of the switch operation portion and an inner circumferential surface of the opening and then becomes frozen, there is a risk that the operation portion may adhere to the housing. Further, when dust enters the housing from the gap, there is a risk that the dust and the switch operation portion may interfere with each other, and it may become difficult to push the switch operation portion into the housing. In the case described above, there is a high possibility that the electronic control device (an electronic control door lock device, an electronic control door latch device, and the like) cannot be operated as intended.

A need thus exists for a vehicular door handle device which is not susceptible to the drawback mentioned above.

SUMMARY

In order to solve the problem described above, a vehicular door handle device according to this disclosure includes a housing that is assembled to a side surface of a door panel of a door of a vehicle outside a compartment, is gripped from an outside of the compartment when the door is opened, is hollow, and is provided with an opening, a switch device that is fixed inside the housing and includes a movable contact portion being disposed in such a way as to face the opening of the housing, an operation member that fits in the opening and is supported in such a way as to be movable in a first direction from an inside to an outside of the housing and in a second direction being an opposite direction to the first direction, and a protector that includes a main body portion covering the switch device, and a first seal portion being inserted into a gap between an inner circumferential portion of the opening and an outer circumferential portion of the operation member and filling the gap, and presses the movable contact portion of the switch device by being pressed by the operation member.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
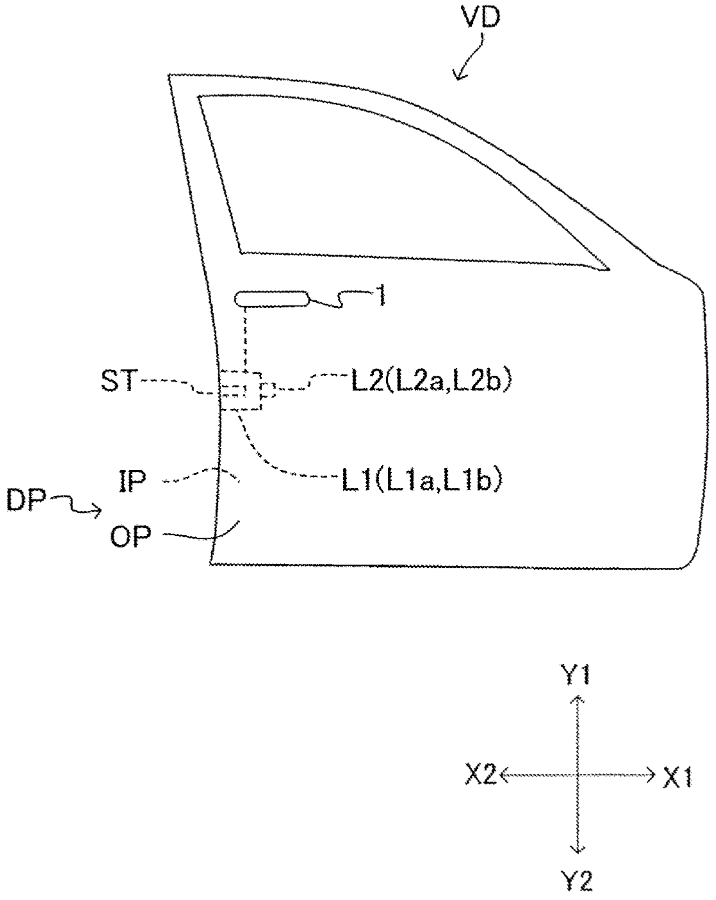
FIG. 1 is a schematic diagram of a vehicular door to which a vehicular door handle device according to one embodiment of this disclosure is applied.

A vehicular door handle device 1 according to one embodiment of this disclosure will be described. First, a schematic configuration of a vehicular door VD (see FIG. 1) to which the vehicular door handle device 1 is applied will be described. Note that the present embodiment is an example in which this disclosure is applied to the vehicular door handle device 1 attached to the vehicular door VD on a right side of a vehicle, but this disclosure is also applicable to a vehicular door handle device attached to another vehicular door.

The vehicular door VD is assembled to an entrance of a vehicle main body. A front edge portion of the vehicular door VD is attached to a front edge portion of the entrance of the vehicle main body via a hinge including a rotation shaft extending in an up-down direction. The vehicular door VD includes a door panel DP. The door panel DP includes an inner panel IP disposed inside a compartment, and an outer panel OP disposed outside the compartment. An edge portion of the inner panel IP and an edge portion of the outer panel OP are joined together. The inner panel IP and the outer panel OP are press-molded in advance in such a way as to form a space between the both panels while the both panels are joined together.

A door latch device L1 that engages with a striker ST provided on an inner circumferential edge portion of the entrance (opening) of the vehicle main body, and holds the vehicular door VD in a closed state is attached to an inside of the door panel DP. The door latch device L1 includes a latch main body L1*a* that can engage with the striker ST, and an electronic control actuator L1*b* that drives (rotates) the latch main body L1*a*. As described below in detail, when a predetermined operator is operated (when a switch device 241 of a push-button type described below transitions from an off state to an on state), the electronic control actuator L1*b* releases engagement between the latch main body L1*a* and the striker ST.

Furthermore, a door lock device L2 that switches between a state where opening of the vehicular door VD (rotation of the latch main body L1*a*) is prohibited and a state where opening of the door is allowed is attached to the inside of the door panel DP. The door lock device L2 includes a mechanism L2*a* for switching between a state where a driving force of the electronic control actuator L1*b* is transmitted to the latch main body L1*a* and a state where the driving force is not transmitted to the latch main body Lia in response to an operation state of the predetermined operator (in the present embodiment, a touch sensor and a portable terminal (key)), and an electronic control actuator L2*b* that drives the mechanism L2*a*.

Figure 2:
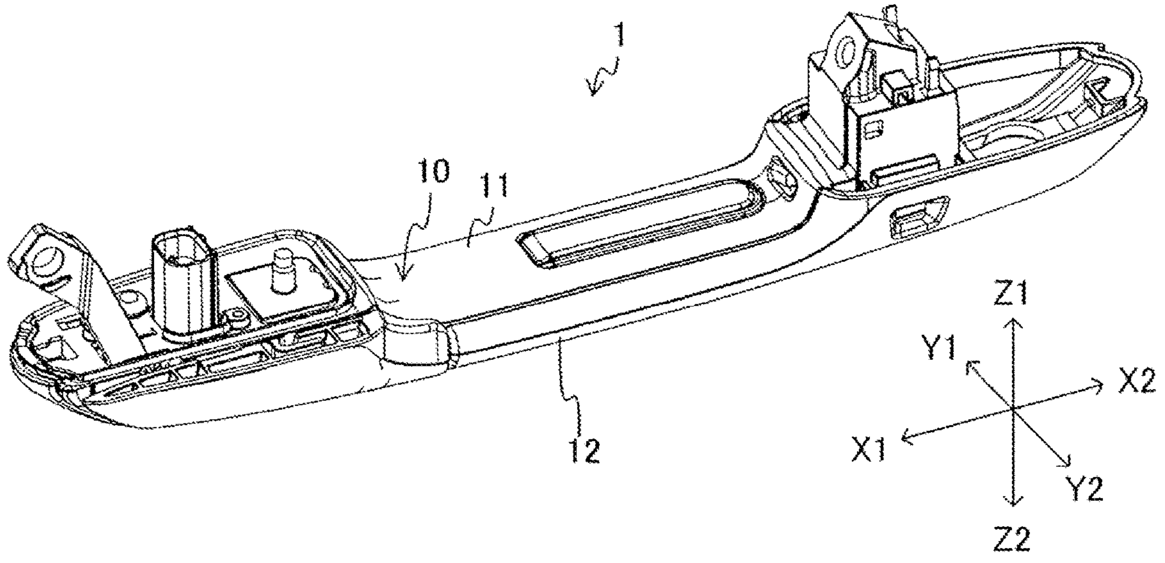
FIG. 2 is a perspective view of the vehicular door handle device in FIG. 1, and is a diagram (diagram viewed from an inside of a compartment and from obliquely front) illustrating a left surface, a lower surface, and a front surface.
Figure 3:
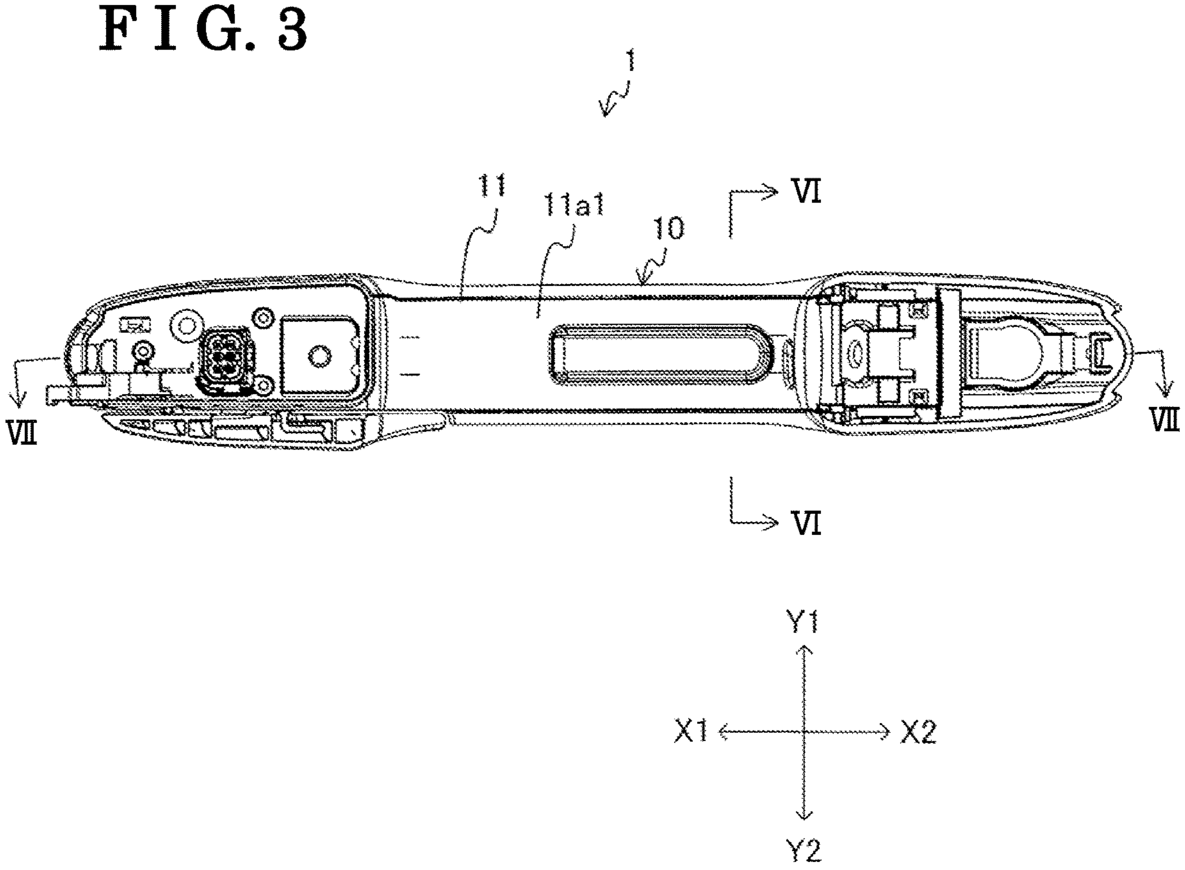
FIG. 3 is a left side view of the vehicular door handle device in FIG. 1.

The vehicular door handle device 1 is disposed on an outer surface of the outer panel OP of the vehicular door VD. As illustrated in FIGS. 2 and 3, the vehicular door handle device 1 extends in a vehicle front-rear direction. In the description below, the vehicle front-rear direction is simply referred to as a front-rear direction. Further, a vehicle height direction is referred to as an up-down direction, and a vehicle width direction is referred to as a left-right direction. Further, an arrow X1 in each diagram indicates the front, and an arrow X2 indicates the rear. Further, an arrow Y1 indicates up, and an arrow Y2 indicates down. Further, an arrow Z1 indicates left (inside of the compartment viewed from the vehicular door handle device 1), and an arrow Z2 indicates right (outside of the compartment viewed from the vehicular door handle device 1).

The vehicular door handle device 1 is supported by (fixed to) a door handle frame that is provided inside the door panel DP and is not illustrated.

As illustrated in FIGS. 4A to 4D, the vehicular door handle device 1 includes a housing 10 and an electronic circuit device 20. The electronic circuit device 20 is housed in the housing 10.

The housing 10 includes a base portion 11 and a cover portion 12.

The base portion 11 extends in the front-rear direction. The base portion 11 is made of a synthetic resin, and is integrally formed. The base portion 11 is a box-shaped member having a substantially cuboid shape that is opened toward the right (outward from the compartment). A depth of a front end portion 11*b* is slightly greater than a depth (dimension in the left-right direction) of an intermediate portion 11*a* of the base portion 11 in the front-rear direction, and a depth of a rear end portion 11*c* is further greater than the depth of the front end portion 11*b*. A bottom wall portion 11*a*1 of the intermediate portion 11*a* is curved in such a way that a front end portion and a rear end portion are located slightly closer to the left (inside of the compartment) than a central portion in a longitudinal direction (front-rear direction) (see FIGS. 4C and 4D). An opening O being substantially rectangular and extending in the front-rear direction is formed in the bottom wall portion 11*a*1 . Further, a leg portion 11*d* extending leftward from a left surface of the front end portion 11*b* is provided. The rear end portion 11*c* and the leg portion 11*d* are inserted into the door panel DP from an opening that is provided in the outer panel OP and is not illustrated, and are attached to the door handle frame that is provided in the door panel DP and is not illustrated. While the rear end portion 11*c* and the leg portion 11*d* are attached to the door handle frame, a recessed portion is formed in a portion of the outer panel OP facing the intermediate portion 11*a* in such a way that a space is formed between the bottom wall portion 11*a*1 of the intermediate portion 11*a* and the outer panel OP. A user can insert a hand into the space from the outside of the vehicle and grip the housing 10.

Figure 4A:
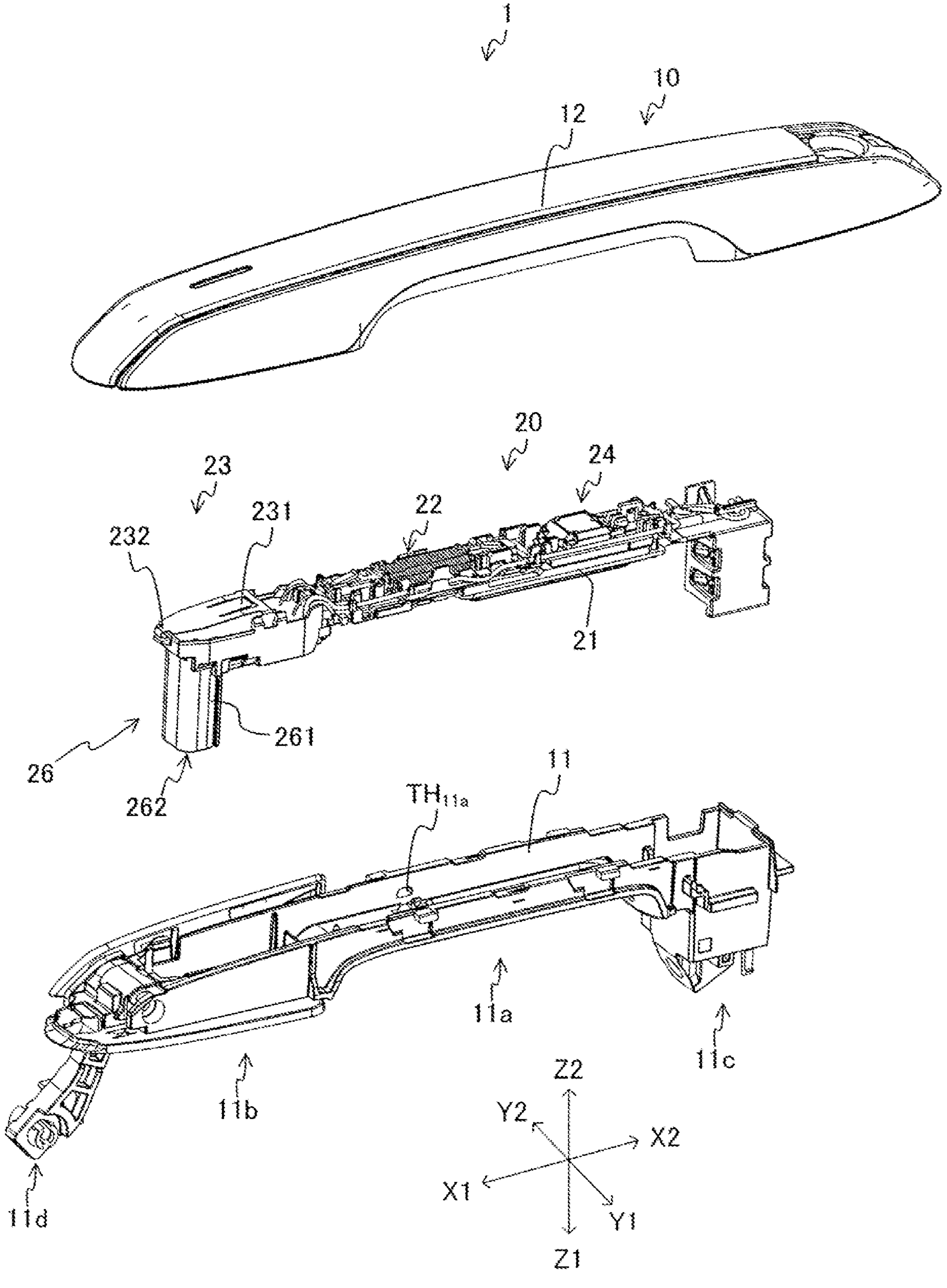
FIG. 4A is an exploded perspective view of the vehicular door handle device in FIG. 1, and is a diagram (diagram viewed from an outside of the compartment and from obliquely front) illustrating a right surface, an upper surface, and the front surface.
Figure 4B:
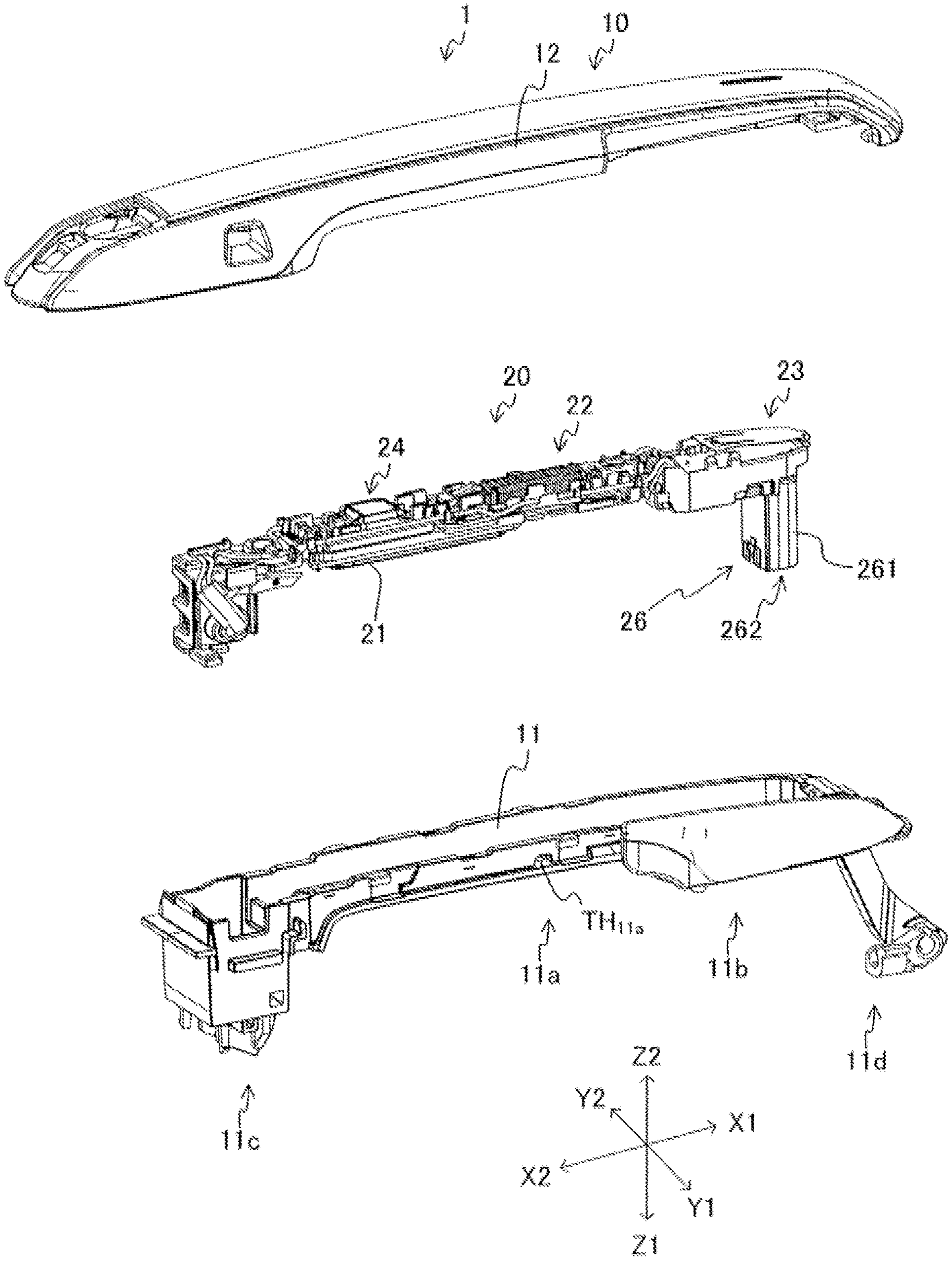
FIG. 4B is an exploded perspective view of the vehicular door handle device in FIG. 1, and is a diagram (diagram viewed from the outside of the compartment and from obliquely rear) illustrating the right surface, the lower surface, and a rear surface.
Figure 4C:
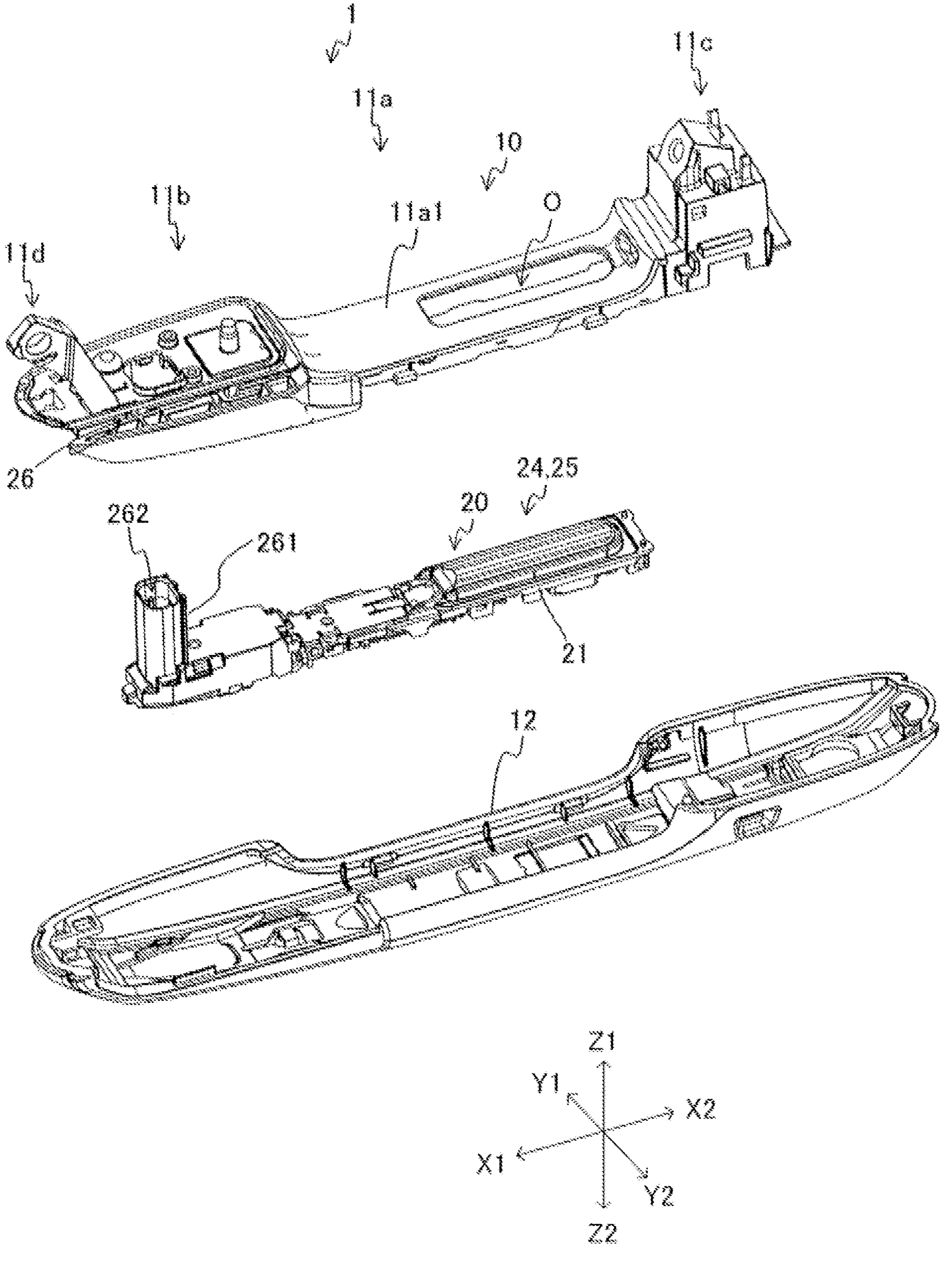
FIG. 4C is an exploded perspective view of the vehicular door handle device in FIG. 1, and is a diagram (diagram viewed from the inside of the compartment and from obliquely front) illustrating the left surface, the lower surface, and the front surface.
Figure 4D:
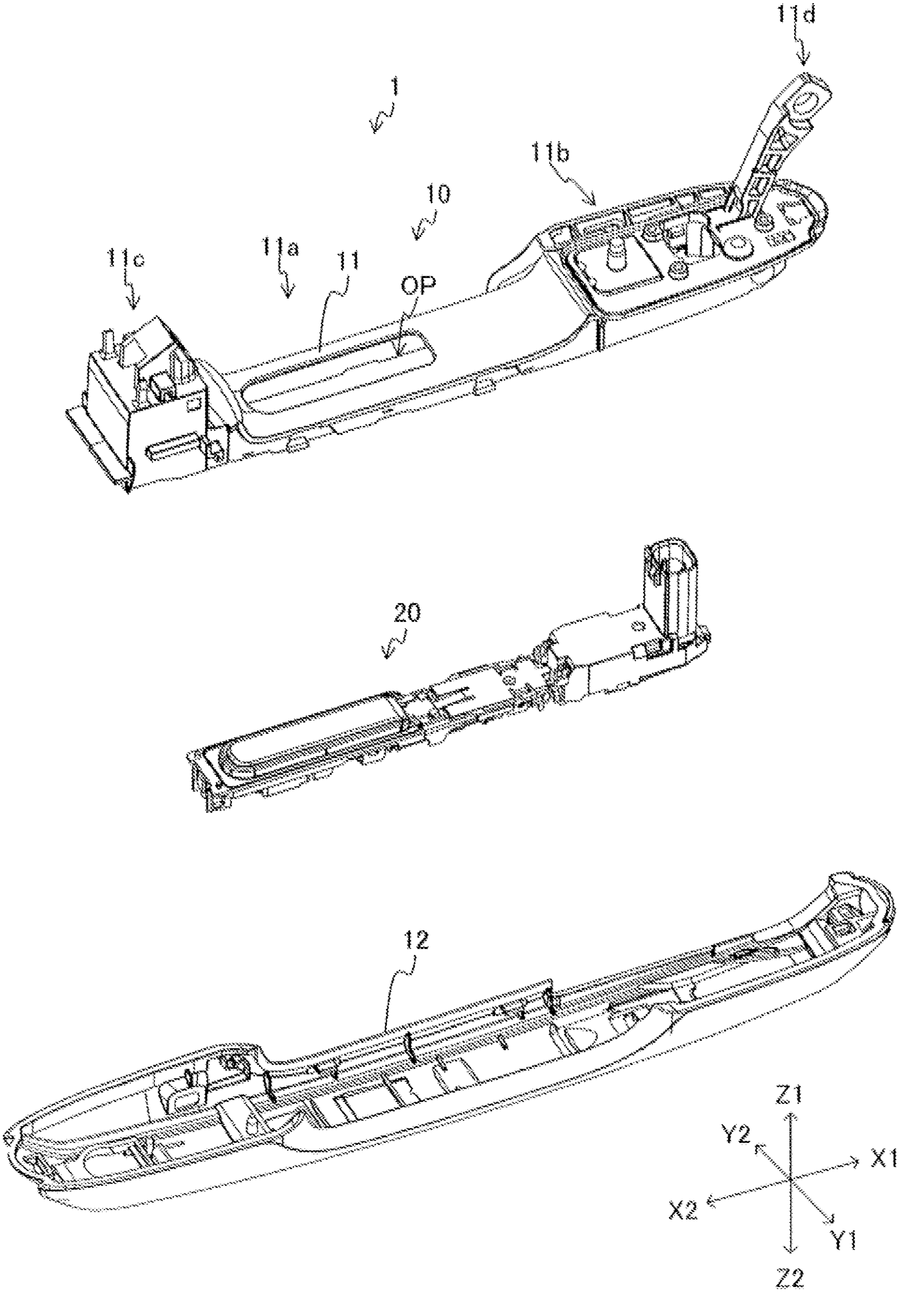
FIG. 4D is an exploded perspective view of the vehicular door handle device in FIG. 1, and is a diagram (diagram viewed from the inside of the compartment and from obliquely rear) illustrating the left surface, the upper surface, and the rear surface.

Furthermore, a relatively small through hole $TH_{11a}$ is provided in a surface of the intermediate portion 11*a* facing downward (see FIGS. 4A and 4B).

The cover portion 12 extends in the front-rear direction. The cover portion 12 is made of a synthetic resin, and is integrally formed. The cover portion 12 is formed in a dome shape in such a way as to have a space therein. The cover portion 12 covers the base portion 11 from a right side of the base portion 11 and engages with the base portion 11 while the electronic circuit device 20 described below is housed in the base portion 11.

The electronic circuit device 20 includes a holder 21, an antenna 22, a locking operator 23, an unlatching operator 24, an unlocking operator 25, and a connector 26.

The holder 21 extends in the front-rear direction, and includes a support portion that supports each of the locking operator 23, the unlatching operator 24, the unlocking operator 25, and the connector 26 that are described below.

The antenna 22 extends in the front-rear direction. The antenna 22 emits a signal (radio wave) indicating various pieces of information to a portable terminal (key) carried by a user. Further, the antenna 22 receives a signal (radio wave) indicating various pieces of information from the portable terminal (key). The antenna 22 is attached to a first half portion of a right surface of the holder 21.

The locking operator 23 includes a capacitance sensor portion 231 (touch sensor) and a terminal portion 232. The capacitance sensor portion 231 is a metal plate that extends in the front-rear direction and is perpendicular to the left-right direction. The locking operator 23 outputs, from the terminal portion 232, an electric signal in response to a change in capacitance of the capacitance sensor portion 231. The locking operator 23 is attached to a front end portion (in front of the antenna 22) of the right surface of the holder 21.

Figure 5A:
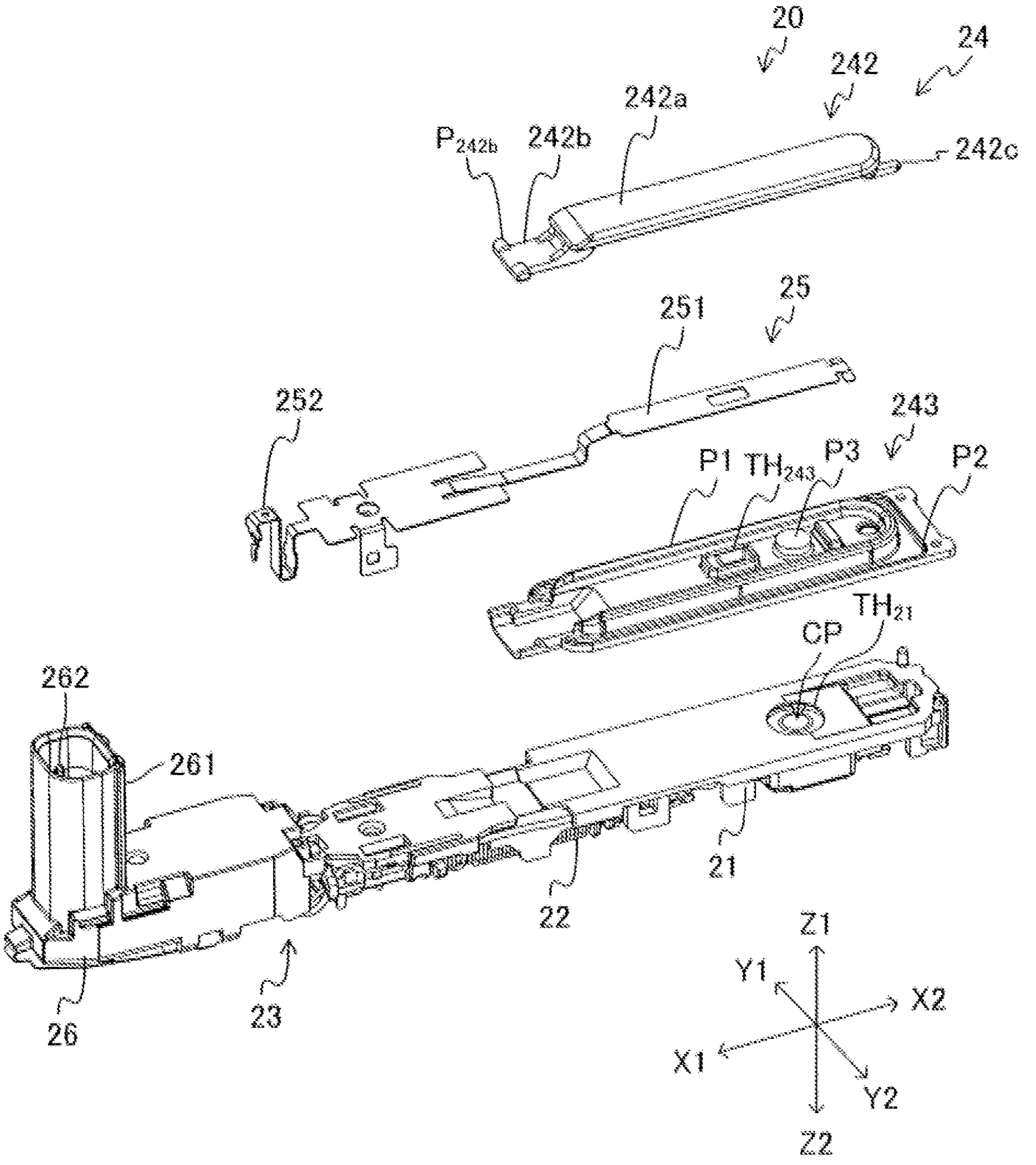
FIG. 5A is an exploded perspective view of an electronic circuit device in FIG. 4C viewed from the inside of the compartment and from obliquely front.
Figure 5B:
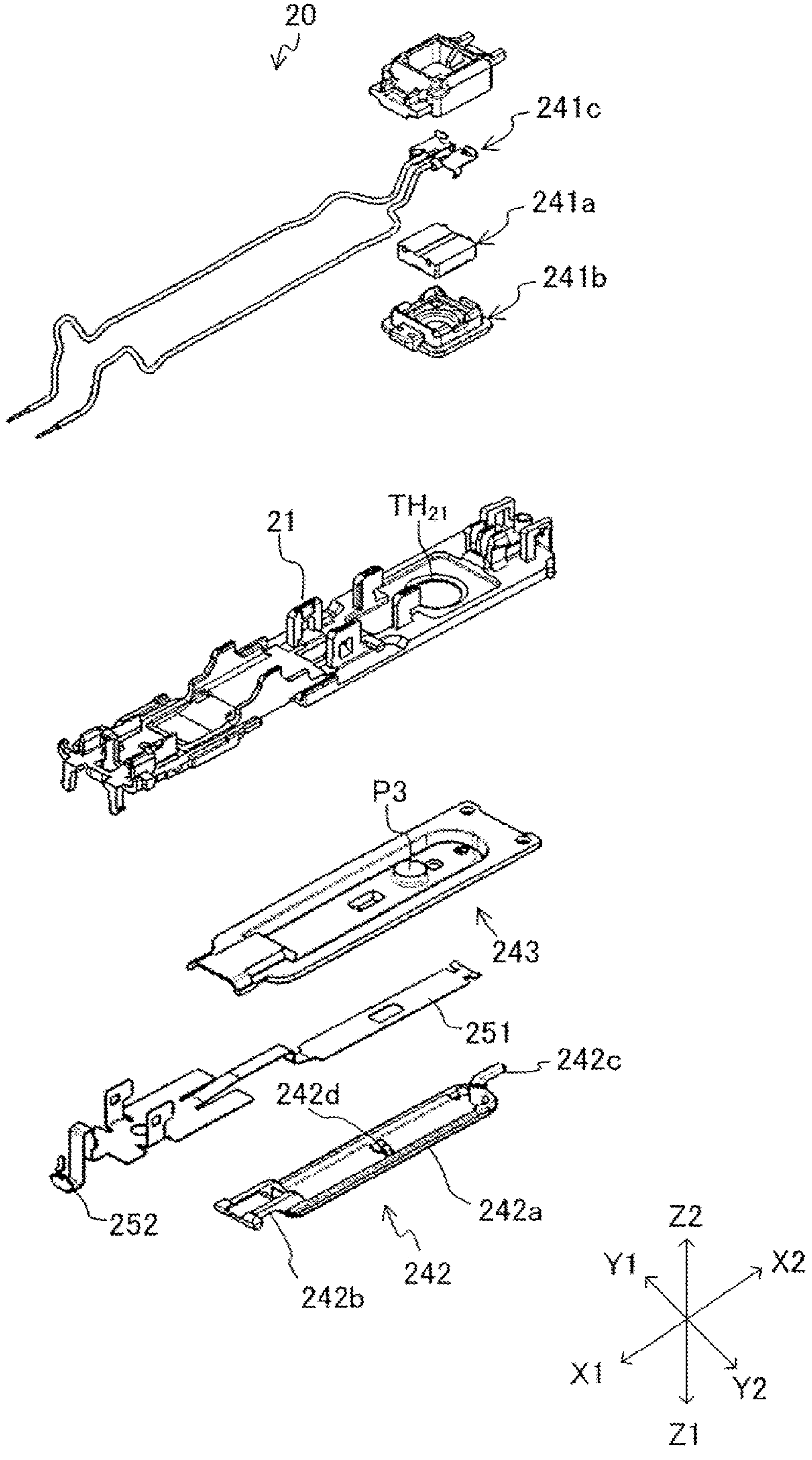
FIG. 5B is an exploded perspective view of the electronic circuit device in FIG. 4C viewed from the outside of the compartment and from obliquely front.

As illustrated in FIGS. 5A and 5B, the unlatching operator 24 includes a switch device 241, an operation lever 242, and a protector 243.

The switch device 241 is formed of a normally open switch 241*a* of a push-button type, a switch case 241*b*, an output terminal (wire harness) 241*c*, and the like. The switch device 241 is attached to a right surface of a rear end portion of the holder 21. A through hole $TH_{21}$ is provided in the rear end portion of the holder 21. A movable contact portion CP of the switch device 241 is disposed inside through hole $TH_{21}$, and faces the rear of the opening O.

Figure 6:
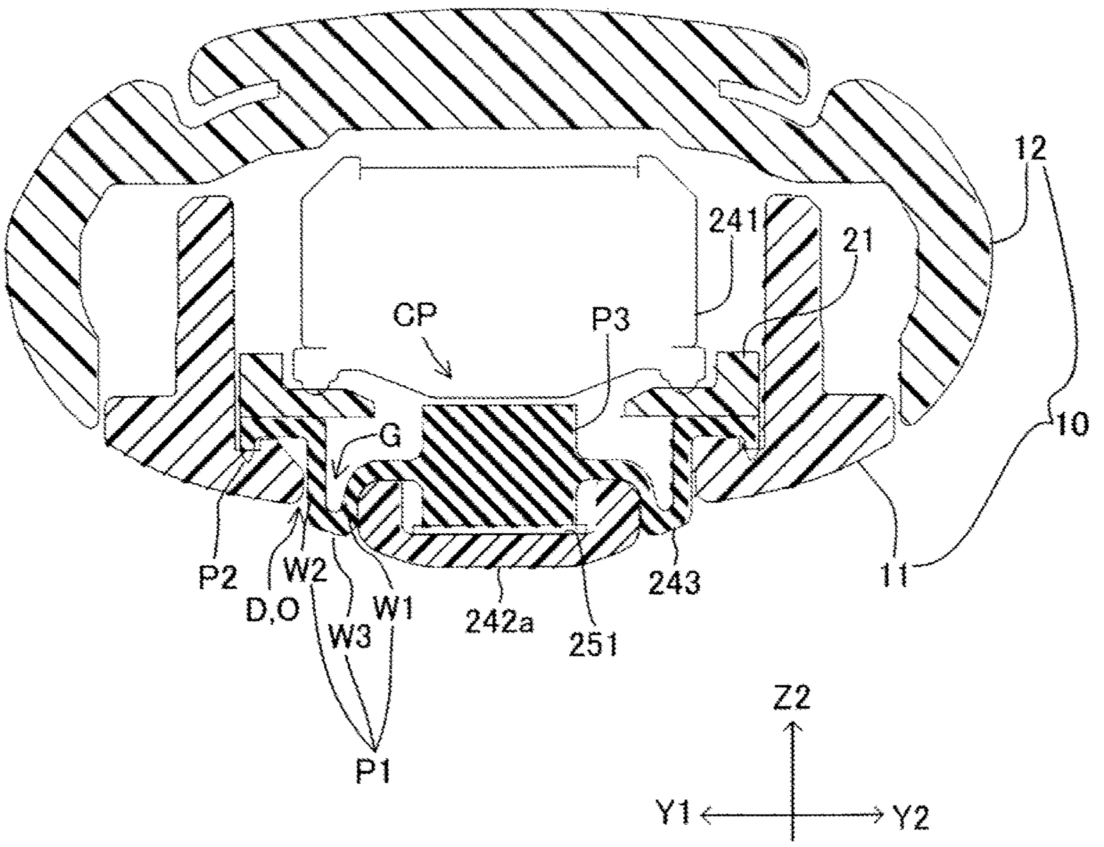
FIG. 6 is a cross-sectional view taken along a VI-VI line in FIG. 3.

The operation lever 242 is formed in a substantially plate shape extending in the front-rear direction. The operation lever 242 is made of a synthetic resin that is relatively hard (that is at least harder than the protector 243 described below), and is integrally formed. The operation lever 242 includes a main body portion 242*a*, a hinge portion 242*b*, a claw portion 242*c*, and a hook portion 242*d*. A shape of the main body portion 242*a* is substantially the same as a shape of the opening O. The hinge portion 242*b* protrudes slightly forward from a front end of the main body portion 242*a*. The main body portion 242*a* fits in the opening O. Dimensions of the main body portion 242*a* and the opening O are set in such a way as to form a relatively small gap D between an outer circumferential surface of the main body portion 242*a* and an inner circumferential surface of the opening O (see FIGS. 6 and 7). A protruding portion $P_{242b}$ extending in the up-down direction is provided on a left surface of the hinge portion 242*b*.

Figure 7:
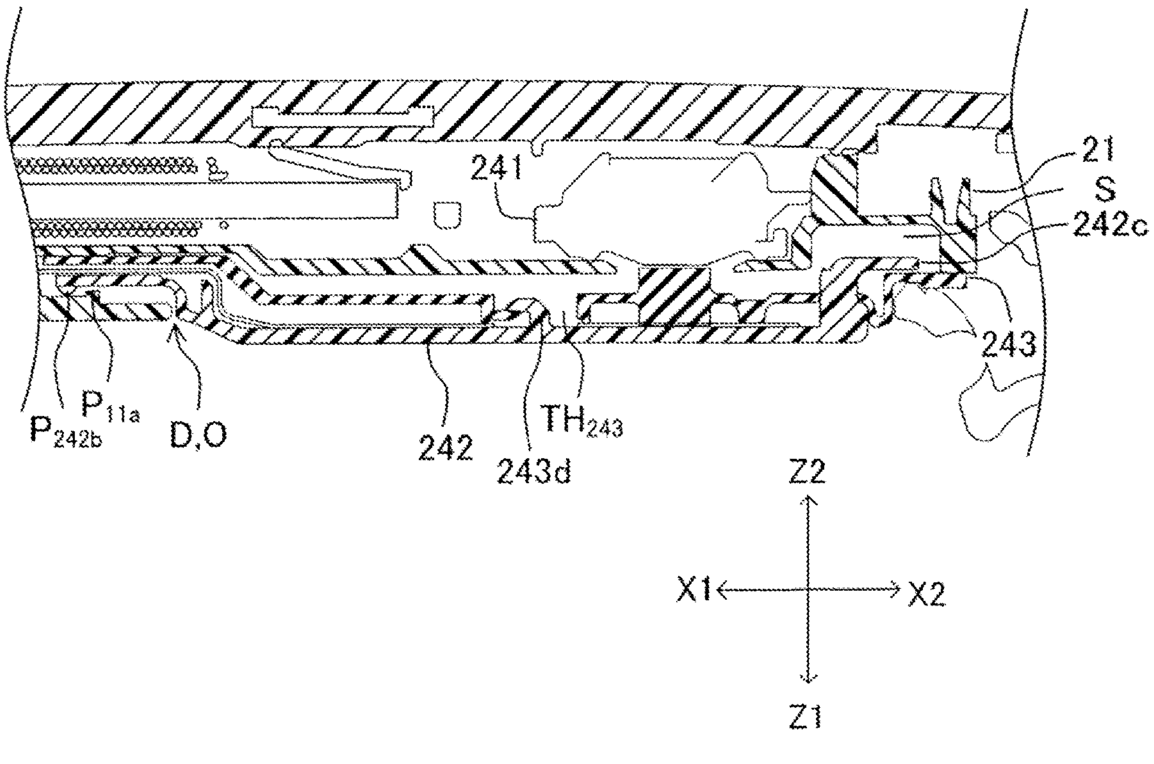
FIG. 7 is a cross-sectional view taken along a VII-VII line in FIG. 3.

The hinge portion 242*b* is sandwiched between a portion that is a right surface of the bottom wall portion 11*a*1 of the base portion 11 (inner surface of the housing 10) and is located slightly closer to the front than a front side of the opening O, and the holder 21 (see FIG. 7). The protruding portion $P_{242b}$ abuts the right surface of the bottom wall portion 11*a*1 of the base portion 11 (inner surface of the housing 10). A protruding portion $P_{11a}$ extending in the up-down direction is formed in a portion of the right surface of the bottom wall portion 11*a*1 of the base portion 11 that is located slightly closer to the rear than an abutment portion between the protruding portion $P_{242b}$ and the bottom wall portion 11*a*1 of the base portion 11. The protruding portion $P_{11a}$ abuts the protruding portion $P_{242b}$, and the operation lever 242 moves rearward, thereby regulating an exit from the housing 10.

The claw portion 242*c* extends rearward from a rear end portion of the main body portion 242*a*. The claw portion 242*c* is located in a space S provided between the holder 21 and the base portion 11.

The hook portion 242*d* protrudes rightward from a right surface of the main body portion 242*a*, and has a tip portion that is bent forward and slightly extends.

The protector 243 is formed in a substantially plate shape extending in the front-rear direction. The protector 243 is disposed between the holder 21 and the operation lever 242. The protector 243 includes a main body portion 243*a*, a first protruding portion P1, a second protruding portion P2, and a third protruding portion P3. The protector 243 is made of synthetic rubber softer than the operation lever 242, and is integrally formed. The main body portion 243*a* is a substantially rectangular plate-shaped portion. A right surface of the main body portion 243*a* abuts a left surface of the holder 21. The main body portion 242*a* covers a portion (through hole $TH_{21}$) of the left surface of the holder 21 to which the switch device 241 is attached.

The first protruding portion P1 is formed on a left surface of the main body portion 243*a*. The first protruding portion P1 extends along the gap D, fits in the gap D, and fills the gap D (see FIG. 6). The first protruding portion P1 is hollow. In other words, a cross section perpendicular to an extending direction of the first protruding portion P1 includes a groove portion G having a substantially U-shape. In other words, the first protruding portion P1 includes a first side wall portion W1 along the outer circumferential surface of the main body portion 242*a* of the operation lever 242, a second side wall portion W2 along the inner circumferential surface of the opening O, and a bottom wall portion W3 that has an arc shape and connects left end portions of the first side wall portion W1 and the second side wall portion W2 to each other. Note that the first protruding portion P1 corresponds to a first seal portion of this disclosure.

The second protruding portion P2 extends along an outer edge portion (an upper side, a lower side, and a rear side) of the left surface of the main body portion 243*a*. In other words, the second protruding portion P2 surrounds the first protruding portion P1. The second protruding portion P2 abuts a left surface of the bottom wall portion 11*a*1 of the base portion 11 (inner surface of the housing 10), and slightly deforms. In other words, the second protruding portion P2 is in close contact with the bottom wall portion 11*a*1. Note that the second protruding portion P2 corresponds to a second seal portion of this disclosure.

The third protruding portion P3 has a cylindrical shape extending in the left-right direction. A right half portion of the third protruding portion P3 protrudes rightward from the right surface of the main body portion 243*a*, and a left half portion thereof protrudes leftward from the left surface of the main body portion 243*a*. A top surface of the right half portion of the third protruding portion P3 faces the movable contact portion CP of the switch device 241.

Furthermore, a through hole $TH_{243}$ is provided in the protector 243. The hook portion 242*d* of the operation lever 242 is inserted into the through hole $TH_{243}$, and engages with a circumferential portion of the through hole $TH_{243}$ in a normal state (a state where the operation lever 242 is not operated).

The unlocking operator 25 includes a capacitance sensor portion 251 and a terminal portion 252. The capacitance sensor portion 251 is a metal plate that extends in the front-rear direction and is perpendicular to the left-right direction. The capacitance sensor portion 251 engages with a right surface of the operation lever 242. The unlocking operator 25 outputs, from the terminal portion 252, an electric signal in response to a change in capacitance of the capacitance sensor portion 251.

The connector 26 is attached to the front end portion of the holder 21. The connector 26 includes a housing 261 and a plurality of contact pins 262. The housing 261 is formed in a tubular shape extending leftward from a front end of the holder 21. The plurality of contact pins 262 are housed in the housing 261 and aligned in a predetermined order.

A terminal of the antenna 22, the locking operator 23, the unlatching operator 24, and the unlocking operator 25 is connected to each of the contact pins 262 via a wire harness, a bus bar, or the like. A plug of a communication cable that connects a control device that is provided in the vehicle main body and is not illustrated and the electronic circuit device 20 fits in the housing 261. In this way, the antenna 22, the locking operator 23, the unlatching operator 24, and the unlocking operator 25 are connected to the control device of the vehicle, and an electric signal indicating an operation manner of each of the operators is supplied to the control device.

In the normal state, the operation lever 242 is biased by an elastic force of the protector 243 in such a way that the main body portion 242*a* of the operation lever 242 heads toward the outside of the housing 10, and the claw portion 242*c* remains at rest in a state of abutting the base portion 11.

When a user who possesses the portable terminal (key) is not present in a predetermined region around his/her vehicle while the vehicular door VD is closed and locked, the control device prohibits the door lock device L2 from causing the vehicular door VD to transition from a locked state to an unlocked state. In other words, in this state, the vehicular door VD remains locked, and another person cannot open the vehicular door VD from the outside of the vehicle.

When a user who possesses the portable terminal (key) approaches his/her vehicle and enters the predetermined region, a signal (radio wave) emitted from the portable terminal is received by the antenna 22, and the signal is supplied to the control device of the vehicle. Then, authentication processing is performed between the control device and the portable terminal. When the portable terminal is a terminal corresponding to his/her vehicle, the control device authenticates the portable terminal as a regular terminal.

When the user touches a surface of the main body portion 242*a* of the operation lever 242 in this state, capacitance of the capacitance sensor portion 251 of the unlocking operator 25 changes. The control device recognizes that the user requests unlocking, based on the change in the capacitance of the capacitance sensor portion 251. Then, the control device controls the door lock device L2, and causes the vehicular door VD to transition from a locked state to an unlocked state. In other words, the control device allows rotation of the latch main body L1*a* of the door latch device L1.

When the user pushes the main body portion 242*a* of the operation lever 242 into the housing 10 in this state, the hinge portion 242*b* of the operation lever 242 is bent, and the main body portion 242*a* moves into the housing 10 and presses the protector 243. Then, the protector 243 elastically deforms. Then, the claw portion 242*c* of the operation lever 242 abuts the holder 21 and remains at rest. At this time, the third protruding portion P3 presses the movable contact portion CP of the switch device 241, and the switch device 241 transitions from an off state to an on state. When the control device detects that the switch device 241 has transitioned from an off state to an on state, the control device controls the door latch device L1 (drives the electronic control actuator Lib), and releases engagement between the latch main body Lia and the striker ST. Then, the user grips the housing 10 of the vehicular door handle device 1 and pulls the housing 10 toward the user, and thus the vehicular door VD opens.

When the user closes the vehicular door VD and touches a front end portion (locking operator 23) of the cover portion 12 of the housing 10, capacitance of the capacitance sensor portion 251 of the locking operator 23 changes. The control device recognizes that the user requests locking, based on the change in the capacitance of the capacitance sensor portion 251. Then, the control device controls the door lock device L2, and causes the vehicular door VD to transition from an unlocked state to a locked state.

In the vehicular door handle device 1 configured as described above, the first protruding portion P1 of the protector 243 fits in and fills the gap D between the outer circumferential surface of the operation lever 242 and the inner circumferential surface of the opening O. Thus, a water droplet, dust, and the like are less likely to enter the housing 10 from the gap D. Furthermore, the second protruding portion P2 disposed outside the first protruding portion P1 suppresses entry of a water droplet, dust, and the like into the housing 10. In other words, even when a slight gap is generated between the first protruding portion P1 and the inner circumferential surface of the opening O, and a small amount of a water droplet, dust, and the like enters from the gap, the second protruding portion P2 suppresses entry of the water droplet or the dust further into the housing 10. Even if a small amount of a water droplet, dust, and the like enters the housing 10, it is discharged from the through hole $TH_{11a}$ to the outside of the housing 10. Thus, according to the present embodiment, an operation fault of the operation lever 242 due to a frozen water droplet, an operation fault of the operation lever 242 due to dust, and the like are less likely to occur. Further, the first protruding portion P1 is configured in such a way as to have a U-shaped cross section. In other words, the first protruding portion P1 is formed to be hollow. Thus, when the operation lever 242 is pushed into the housing 10, the first protruding portion P1 is more likely to deform in response to the operation as compared to a case where the first protruding portion P1 is solid. In other words, an operational feeling of the operation lever 242 is light and excellent.

Further, the capacitance sensor portion 251 is disposed on the right surface (rear surface) of the main body portion 242*a* of the operation lever 242 made of a synthetic resin. Thus, when the main body portion 242*a* of the operation lever 242 is pushed, the main body portion 242*a* is more likely to deform as compared to a case where the operation lever 242 is made of synthetic rubber. Thus, a load due to deformation of the main body portion 242*a* is hardly applied to the capacitance sensor portion 251, and damage to the capacitance sensor portion 251 can be suppressed. Further, since the operation lever 242 is made of a synthetic resin, when the main body portion 242*a* is pushed with a hand, a portion of the main body portion 242*a* touched by the hand hardly deforms. Thus, a more excellent operational feeling can be acquired as compared to a case where the operation lever 242 is made of synthetic rubber.

Furthermore, execution of this disclosure is not limited to the embodiment described above, and various modifications may be made to this disclosure without departing from the purpose of this disclosure.

For example, in the embodiment described above, the switch device 241 functions as an operator for driving the door latch device L1, but the switch device 241 may be configured in such a way as to function as an operator for operating another device. Further, in the embodiment described above, the switch device 241 of a push-button type is adopted, but another switch device including a movable contact portion may be adopted.

Figure 8:
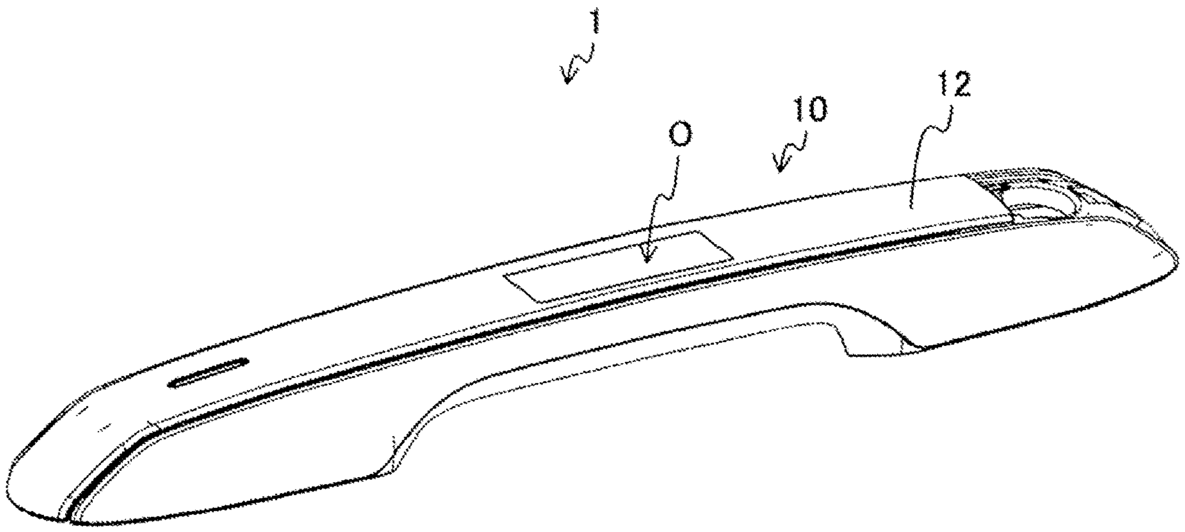
FIG. 8 is a perspective view of a cover portion of the vehicular door handle device according to a modification example of this disclosure.

Further, in the embodiment described above, the opening O is provided in the surface of the housing 10 facing the door panel DP side. Instead of this, for example, as illustrated in FIG. 8, the opening O may be provided in a surface (cover portion 12) of the housing 10 facing an opposite side to the door panel DP. In this case, the unlatching operator 24 and the unlocking operator 25 are attached inside the housing 10 in such a way that an orientation of the vehicle width direction thereof is opposite to that in the embodiment described above.

A vehicular door handle device according to this disclosure includes a housing that is assembled to a side surface of a door panel of a door of a vehicle outside a compartment, is gripped from an outside of the compartment when the door is opened, is hollow, and is provided with an opening, a switch device that is fixed inside the housing and includes a movable contact portion being disposed in such a way as to face the opening of the housing, an operation member that fits in the opening and is supported in such a way as to be movable in a first direction from an inside to an outside of the housing and in a second direction being an opposite direction to the first direction, and a protector that includes a main body portion covering the switch device, and a first seal portion being inserted into a gap between an inner circumferential portion of the opening and an outer circumferential portion of the operation member and filling the gap, and presses the movable contact portion of the switch device by being pressed by the operation member.

In the vehicular door handle device configured as described above, the first seal portion of the protector fits in and fills the gap between the inner circumferential portion of the opening and the outer circumferential portion of the operation member. Thus, a water droplet, dust, and the like are less likely to enter the housing from the gap. Thus, according to this disclosure, an operation fault of the operation member due to a frozen water droplet, an operation fault of the operation member due to dust, and the like are less likely to occur.

In the vehicular door handle device according to one aspect of this disclosure, a holder that supports the switch device may be provided. The protector may include a second seal portion that protrudes in the second direction from a surface of the main body portion, and extends in such a way as to surround the first seal portion on an outer circumferential side of the first seal portion. The second seal portion may be sandwiched between the holder and an inner side surface of the housing, and be in close contact with the inner side surface.

According to the configuration described above, in addition to the first seal portion, the second seal portion suppresses entry of a water droplet, dust, and the like into the housing. Specifically, even when a slight gap is generated between the first seal portion and the inner circumferential portion of the opening, and a small amount of a water droplet, dust, or the like enters from the gap, the second seal portion suppresses entry of the water droplet or the dust further into the housing.

In the vehicular door handle device according to another aspect of this disclosure, a through hole may be provided in a portion of the housing facing downward.

According to the configuration described above, even when a small amount of a water droplet, dust, or the like enters the housing from the gap between the operation member and the opening, the water droplet, dust, or the like is discharged from the through hole to the outside of the housing.

In the vehicular door handle device according to another aspect of this disclosure, the protector may be made of rubber. The first seal portion may include a groove portion extending in parallel with the outer circumferential surface of the operation member and the inner circumferential surface of the opening.

According to the configuration described above, when the operation member moves in the first direction or the second direction, the first seal portion is more likely to deform in response to the operation as compared to a case where the first seal portion is solid. In other words, an operational feeling of the operation member is light and excellent.

In the vehicular door handle device according to another aspect of this disclosure, the operation member may be made of a resin. The vehicular door handle device may further include a capacitance sensor disposed between the operation member and the protector.

According to the configuration described above, since the operation member is made of a resin, the operation member itself is less likely to deform as compared to a case where the operation member is made of rubber. Thus, application of a load to the capacitance sensor due to deformation of the operation member can be suppressed, and damage to the capacitance sensor can be suppressed. Further, since the operation member is made of a resin, when the operation member is pushed with a hand, a portion of the operation member being touched by the hand is less likely to deform. Thus, a more excellent operational feeling can be acquired as compared to a case where the operation member is made of rubber.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A vehicular door handle device comprising:

a housing that is assembled to a side surface of a door panel of a door of a vehicle outside a compartment, is gripped from an outside of the compartment when the door is opened, is hollow, and is provided with an opening;

a switch device that is fixed inside the housing, and includes a movable contact portion being disposed in such a way as to face the opening of the housing;

an operation member that fits in the opening, a first end of the operation member including a hinge portion that is supported on the housing in such a way to configure the operation member to be movable in a first direction from an inside to an outside of the housing and in a second direction being an opposite direction to the first direction, a second end of the operation member being movable relative to the housing based on the support of the hinge portion by the housing; and a protector that includes a main body portion covering the switch device, and a first seal portion being inserted into a gap between an inner circumferential portion of the opening and an outer circumferential portion of the operation member and filling the gap, and presses the movable contact portion of the switch device by being pressed by the operation member, wherein the hinge portion is sandwiched between a bottom wall of the housing and the protector, the hinge portion abutting the bottom wall and being bent when the operation member is moved to press the protector.

2. The vehicular door handle device according to claim 1, further comprising a holder that supports the switch device, wherein the protector includes a second seal portion that protrudes in the second direction from a surface of the main body portion, and extends in such a way as to surround the first seal portion on an outer circumferential side of the first seal portion, and the second seal portion is sandwiched between the holder and an inner side surface of the housing, and is in close contact with the inner side surface.

3. The vehicular door handle device according to claim 1, wherein a through hole is provided in a portion of the housing facing downward.

4. The vehicular door handle device according to claim 1, wherein the protector is made of rubber, and the first seal portion includes a groove portion extending in parallel with an outer circumferential surface of the operation member and an inner circumferential surface of the opening.

5. The vehicular door handle device according to claim 1, wherein the operation member is made of a resin, and p1 the vehicular door handle device further comprises a capacitance sensor disposed between the operation member and the protector.

* * * * *